United States Patent [19]
Romero

[11] 3,737,587
[45] June 5, 1973

[54] TELEPHONE SWITCHING SYSTEM HAVING CALL PICKUP SERVICE

[75] Inventor: Roderic Romero, Boulder, Colo.

[73] Assignee: Bell Telephone Laboratories, Incorporated, Murray Hill, N.J.

[22] Filed: Oct. 15, 1971

[21] Appl. No.: 189,564

[52] U.S. Cl. ............................ 179/18 B, 179/18 AD
[51] Int. Cl. ............................ H04m 3/42
[58] Field of Search ........................ 179/18 B, 18 BE, 179/18 AD, 99

[56] References Cited

UNITED STATES PATENTS 3,363,062 1/1968 Hohmann Jr. et al. ..........179/18 AD

*Primary Examiner*—Thomas W. Brown
*Attorney*— R. J. Guenther and James Warren Falk

[57] ABSTRACT

A wired logic electronically controlled switching system is disclosed having subscriber stations divided into a plurality of groups together with facilities whereby any subscriber may dial a predetermined code to answer an incoming call directed to another station in the same group.

17 Claims, 14 Drawing Figures

INVERTING OR GATE

INVERTING AND GATE

INVERTER

FLIP-FLOP

TELEPHONE SWITCHING SYSTEM HAVING CALL PICKUP SERVICE

BACKGROUND OF THE INVENTION

This invention relates to a telephone system and in particular to a private branch exchange (PBX) system which enables calls to be answered by stations other than those to which they are directed. This invention further relates to a PBX system in which a station user may dial a predetermined code to pick up or answer calls directed to other stations — usually nearby stations, such as those in the same room or work area.

In PBX systems it is common practice, and obviously desirable, to provide facilities whereby calls may be answered by stations other than those to which they are directed. These facilities often comprise a plurality of pushbutton keys on each station subset. One key is normally for calls directed to the station itself; the other keys are for the nearby stations whose calls are to be answered. In such systems, a station user merely depresses the proper key and lifts his handset to answer a call directed to another station. Although this key type arrangement permits a call directed to one station may be answered at another station, the required equipment is sufficiently complex and expensive so that its application has been limited.

Recently introduced stored program controlled PBX systems provide call pickup service by subdividing its stations into a plurality of groups and by providing a code that may be dialed at any station to answer a call incoming to any other station of the same group. This is an improvement over key type systems since it eliminates the necessity of equipping each subset with a key individual to each station whose calls are to be answered. Although the call pick facilities of stored program systems are advantageous, they are limited in their applicability since they cannot be easily implemented in wired logic type switching systems.

BRIEF SUMMARY OF THE INVENTION

It is, therefore, an object of the invention to provide improved call pickup facilities.

It is a further object to provide call pickup facilities for wired logic controlled systems which are of less complexity and cost than the prior art arrangements.

It is a still further object to provide call pickup facilities for wired logic PBX type systems which, insofar as a station user is concerned, operate with the same ease and simplicity as the call pickup facilities of stored program controlled systems.

SUMMARY DESCRIPTION OF THE INVENTION

In accordance with my invention, I provide facilities in a wired logic PBX which permit calls directed to any station to be answered by a user at a nearby station by the dialing of a predetermined code. In a manner somewhat similar to the available stored program arrangements, I subdivide the stations into a plurality of groups and, by the dialing of the pickup code, a station user may answer a call directed to any other station of the same group. This eliminates the necessity of providing the subset of each station with a key individual to each other station whose calls are to be answered.

In accordance with my invention, the call pickup sequence is activated when a subscriber at a requesting station dials the pickup code to answer a call incoming to another station. The dialing of the call pickup code is detected by the register to which the requesting station is connected, and the call pickup circuitry of my invention is activated by an output signal from the register. A call-back potential is then transmitted from the register, through the network, to the line circuit of the requesting station. This potential identifies the requesting station by setting a flip-flop unique to the pickup group of the station.

Next, after the requesting station is identified, the system initiates a scanning operation of all trunk circuits to determine which trunk circuits are currently in a ringing condition. Since each trunk circuit serving a call that has not yet been answered is in a ringing condition, the scanning of all such trunk circuits will insure that the scanner ultimately encounters the trunk circuit connected to the call that is to be picked up. Each time the scanner encounters a trunk circuit in a ringing condition, it temporarily stops and causes a call-back potential to be transmitted from the trunk circuit, through the switching network, to the called station to which the trunk circuit is connected. Upon the receipt of this call-back potential, the called station generates an identification signal which permits the call pickup circuitry to determine whether this station is in the same pickup group as the requesting station; i.e., whether this station is serving the call the requesting station is attempting to pick up.

If the two stations are not in the same group, the trunk scanner resumes its operation and scans until it again encounters another ringing trunk circuit. At this time, a call-back potential is again transmitted back from the newly scanned trunk circuit to the station to which it is connected to determine whether this station is in the same group as the requesting station. If it is not, the scanner again resumes its operation as already described.

When a ringing trunk circuit is found that is connected to a station in the same group as the requesting station, call pickup circuitry unique to the group of the requesting station transmits a signal to this effect to the system controller which terminates the trunk scanning operation. The network connection between the currently scanned trunk circuit and the called station is released and a new connection is established between this trunk circuit and the requesting station. The party at the requesting station may converse with the calling party after this connection is established.

A feature of the invention is the provision of circuitry in a wired logic type switching system which enables a station user to answer an incoming call directed to any other station of the same pickup group by dialing a predetermined pickup code.

A further feature is the provision of equipment for transmitting a potential from a register back through the network to the line circuit of the requesting station upon the dialing of a pickup code in order to identify the pickup group number to which the requesting station is assigned.

A further feature is the provision of facilities for scanning each trunk circuit currently in a ringing condition and, as each ringing trunk circuit is scanned, for transmitting a potential from the trunk circuit through the network to the called station to which the trunk circuit is connected in order to determine whether the trunk circuit is connected to a station in the same pickup group as that of the requesting station.

A further feature is the provision of facilities for reactivating the trunk circuit scanner in the event a scanned ringing trunk circuit is not connected to a station in the same pickup group as that of the requesting station.

A further feature is the provision of facilities for terminating the trunk scanning operation when it is determined that a scanned ringing trunk circuit is connected to a called station in the same pickup group as that of the requesting station.

A further feature is the provision of facilities responsive to a determination that a scanned ringing trunk circuit is connected to a station in the same group as that of the requesting station for releasing the network connection between the trunk circuit and the station to which it is currently connected, and for establishing a new network connection between the trunk circuit and the line circuit of the requesting station.

DRAWING

These and other objects and features of the invention will become more apparent upon the reading of the following detailed description of one specific embodiment of the invention taken in conjunction with the drawing in which FIGS. 1A, 1B, and 1C, when arranged as shown in FIG. 1D, illustrate my invention in diagrammatic form;

FIGS. 2A, 2B, 2C, and 2D, when arranged as shown in FIG. 2E, illustrate my invention in further detail;

FIG. 3A discloses the details of a basic transistor logic circuit;

Logic Gates — FIGS. 3A, 3B, 3C, 3D, and 3E

Figure 3A:
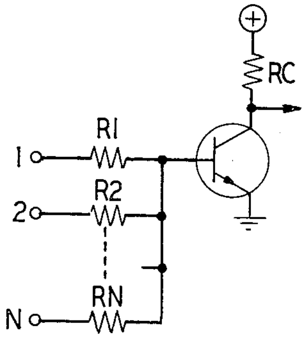
FIG. 3B illustrates the symbol used when the circuit of 3A is operated as an inverting OR gate.
FIG. 3C illustrates the symbol used when the circuit of FIG. 3A is operated as an inverting AND gate.
FIG. 3D illustrates the symbol used when the circuit of FIG. 3A is operated as an inverter.
FIG. 3E illustrates how gates of the type shown in FIG. 3B may be interconnected to form a flip-flop circuit.

The disclosed system makes extensive use of transistor resistor logic circuits in which a single transistor stage is used as an inverter, an inverting AND gate, or an inverting OR gate, depending upon the nature of the input signals applied thereto and the function to be performed by the stage. FIG. 3A discloses a schematic of a circuit which comprises a single NPN transistor, a collector resistor RC, and a plurality of input resistors, R1 – RN, of which there is one for each input. The circuit of FIG. 3A is basically a single-stage inverter since a positive-going signal applied to the base appears as a negative-going signal at the collector, and vice versa.

The stage may be used as an inverting OR gate leaving the circuit normally cut off; i.e., all inputs LOW (ground). In this case, a positive-going signal applied to one or more input leads will turn the transistor ON and provide a negative-going signal on the collector. The stage also may be used as an inverting AND gate. In this case the transistor is normally held ON by a positive signal applied to one or more of its inputs. The AND condition of the circuit is achieved by a ground potential on all inputs. This turns the transistor OFF and produces a positive-going signal at its output.

Figure 3B:
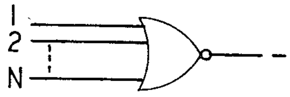

FIG. 3B illustrates the symbol used when the circuit of FIG. 3A is operated as an inverting OR gate.

Figure 3C:
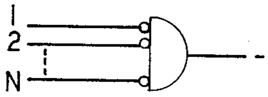

FIG. 3C illustrates the symbol used when the circuit of FIG. 3A is operated as an inverting AND gate.

Figure 3D:
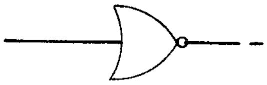

FIG. 3D illustrates the symbol used when the circuit of FIG. 3A is operated as a single input inverter.

Figure 3E:
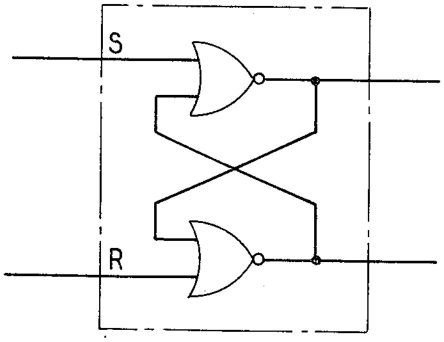

FIG. 3E discloses the symbol used when two inverter gates of the type shown in FIG. 3B are interconnected and operated as a flip-flop. The flip-flop is said to be in a set state when the upper gate is conducting and in a reset state when its lower gate is conducting. The output conductor of a conducting stage is LOW; the output conductor of a nonconducting stage is at a HIGH potential. The flip-flop is switched from one state to the other by momentarily applying a HIGH potential to the input of the nonconducting stage.

Figure 1A:
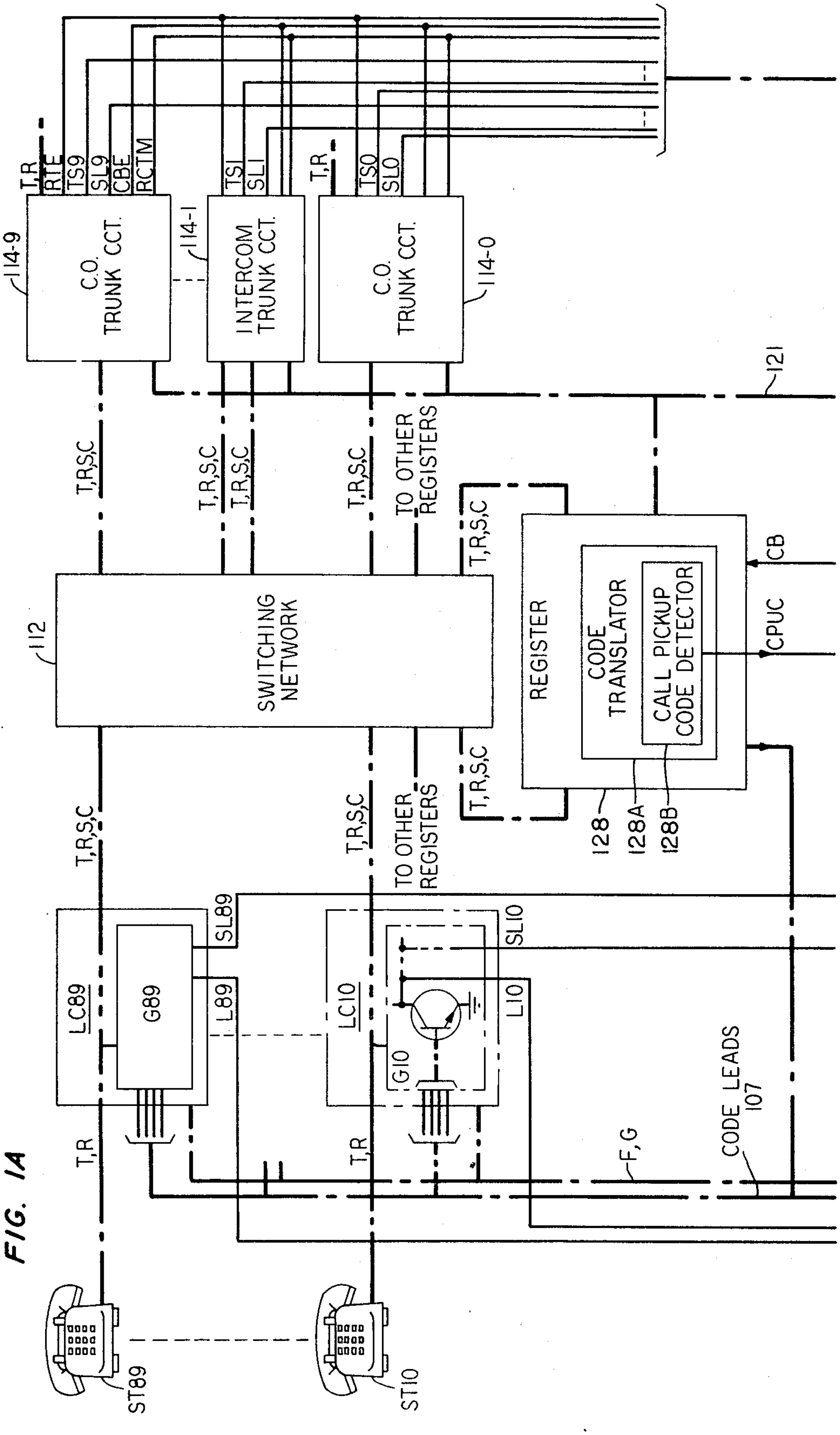
Figures 1B, 1D:
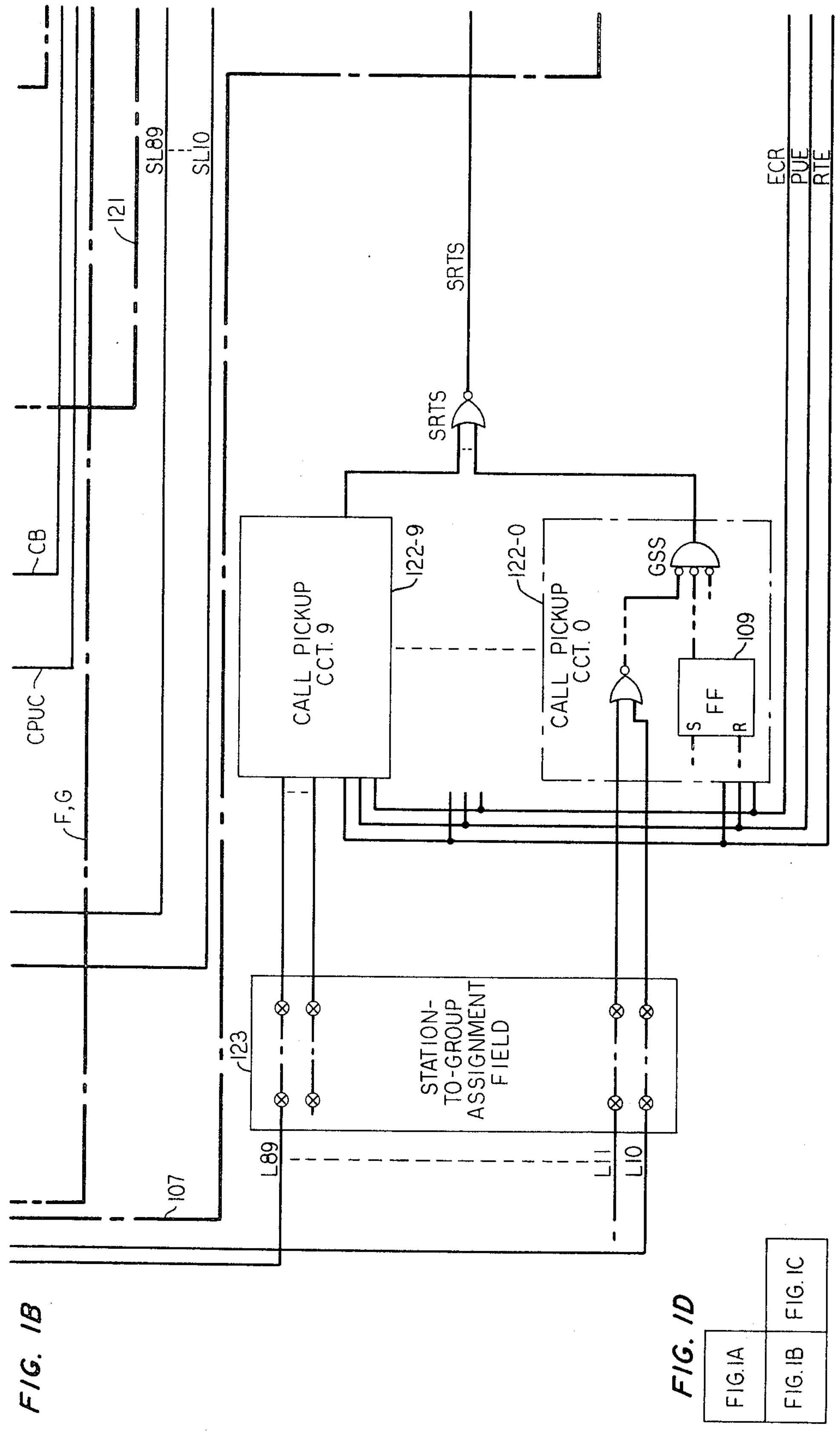
Figure 1C:
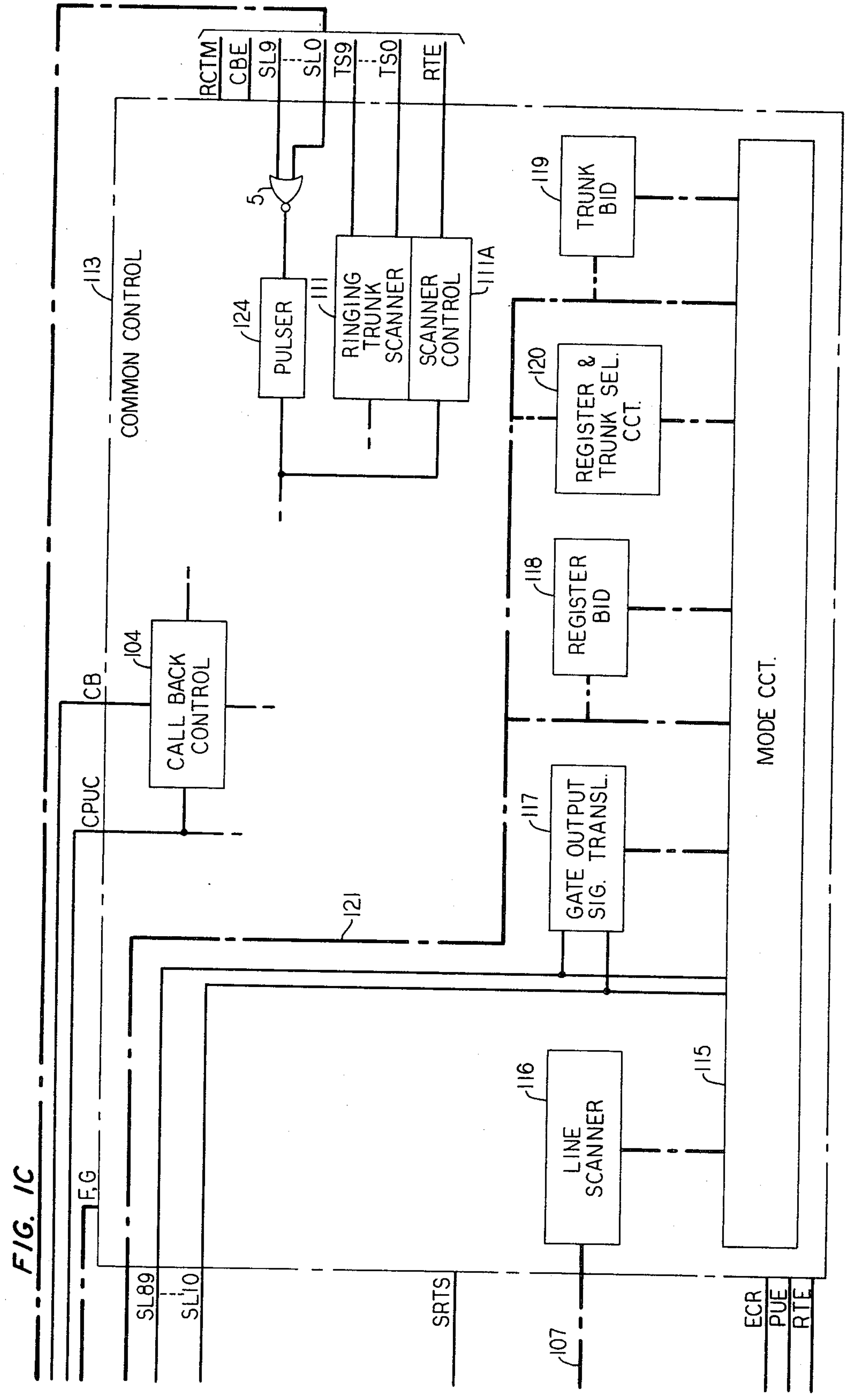

General Description — FIGS. 1A, 1B, and 1C

FIGS. 1A, 1B, and 1C, when arranged with respect to each other as shown in FIG. 1D, disclose the broader system aspects of my invention. My invention is disclosed as embodied in a wired logic electronic type PBX of the the type disclosed in detail in the H. H. Abbott et al. U.S. Pat. No. 3,377,432 issued Apr. 9, 1968. The Abbott et al. specification is hereby incorporated as a part of the present specification to the same extent as if fully set forth herein.

The system comprising my invention includes an end-marked network which is designated as element 112 on FIG. 1A. It further includes a plurality of PBX stations ST10 through ST89 each of which is connected to one of line circuits LC10 through LC89. Each line circuit is connected to the switching network 112 and is additionally connected by means of various conductors to common control 113 on FIG. 1C. These conductors include a set of code leads 107, conductors F and G, and an SL- conductor such as conductor SL10 for line circuit LC10. As subsequently described, the code leads permit common control to scan and identify the various line circuits; the SL- conductors permit common control to receive signals from the line circuits indicating their current conductive states.

The disclosed embodiment also includes a plurality of registers, such as register 128. It further includes a plurality of trunk circuits 114-0 through 114-9. The line circuits are connected to the left side (the line side) of the network; the trunk circuits are connected to the right side (the trunk side) of the network. Each register has both a line side and a trunk side appearance in order that it may be connected by the network to a trunk circuit on an incoming call or to a line circuit on an outgoing or intra-PBX call. The switching network is of the end-marked type and in response to the presence of a marking potential on each side thereof it establishes, independently of the remainder of the system, a network interconnection between the circuits associated with the marked terminal.

The disclosed system is of the common control type, in which the common control 113 governs the order in which the various circuits are interconnected by the network during the serving of each call. Common control receives call service requests from the line circuits, from the registers, and from the trunk circuits. Upon the receipt of each request, common control sets its mode circuit 115 to a state unique to the request. The mode circuit and common control together regulate the operation of the requesting circuit, as described in the Abbott et al. patent, and control the establishment of a network connection between the requesting circuit and any circuit of the system with which the requesting circuit must be connected. The serving of a call may require a plurality of network connections to be established sequentially.

Each line circuit includes a transistor gate which is selectively controlled to assume either an ON or an OFF conductive state. A gate is said to be on whenever it receives an energizing potential at its input (its base), and is said to be OFF when no energizing potentials are applied to its input. The conductive state of a gate, such as Gate G10 in line circuit LC10, is controlled by energizing potentials received from the G and F leads as well as from code leads 107. Each potential source is effective by itself to maintain a line circuit gate ON, independent of the other source. A potential is applied to the S lead at certain times and is effective to cancel the energizing potential received over the G and F leads to cause a gate to turn OFF, provided it is not at the same time receiving an energizing potential over one of the code leads. The code leads are also connected to the register in order that that circuit may at certain times control the conductive state of the line circuit gates.

Signals indicating the conductive state of each line circuit gate are transmitted over the SL- conductors to common control. These signals enable common control to monitor the ON and OFF state of each line circuit gate and, in turn, by means of prewired logic, to determine whether a line circuit requires action by the common control with regard to either a call initiated by or directed to the line circuit. Included among the functions performed by common control in connection with the establishment of calls are the recognition of a service request from a calling line circuit, the identification of a calling line circuit requiring a connection to a register, the selection of a called line circuit following the registration of a called number by the register, the selection of a trunk circuit, and the identification of a calling line circuit at the time it is to be connected to the selected trunk circuit and, in turn, to the called line circuit.

Common control includes a line circuit scanner 116 having a plurality of output positions which are connected by the code leads 107 to the line circuits. Each line circuit is connected to a unique combination of code leads. Common control also includes a gate output signal translator 117 which is connected to conductors SL10 through SL89 of the line circuits. Element 117 translates the signals received from the line circuit gates and informs common control regarding the current status of a call served by a line circuit. Common control also includes a register bid circuit 118 and a trunk bid circuit 119 which receive signals from the registers and trunk circuits, respectively, at the time these circuits require further service from common control. Common control also includes a register and trunk selection circuit 120 whose function is to select an idle register or an idle trunk circuit for connection to a line circuit.

Normal System Operation

The operation of the system of FIGS. 1 for the serving of calls that do not require pickup service is fully described in detail in the Abbott et al. patent. Therefore, the following only briefly describes how such calls are served. This description is made with the assumption that station ST10 initiates a call that is to be extended to station ST89.

Common control supplies energizing potentials over the G and F leads to each line circuit to hold its gate ON during the idle state of the circuit. An off-hook condition at a calling station, such as ST10, causes off-hook detection circuitry within gate G10 to cancel this potential and to turn the gate OFF. This causes a change of state signal to be transmitted over conductor SL10 to common control to advise it that one of the line circuits is currently requesting service. In response to the receipt of this signal, and as described in the Abbott et al. patent, common control initiates a scanning operation of all line circuits by means of scanner 116 via the code leads 107. The gate in the calling line circuit is switched ON when scanning begins and is switched OFF again when the calling line circuit is scanned. A change of state signal is transmitted over signal leads SL10 to common control when the gate switches OFF. This stops the scanner in its operative position associated with line circuit LC10.

Common control now selects an idle register such as register 128, causes the register to mark its C lead trunk side network appearance, and causes the line circuit to mark its C lead network appearance. The network then completes a path between line circuit LC10 and the register. The calling party now dials the digits 89 to obtain a connection to station ST89. The dialed digits are registered and the output of the register is gated onto the code leads to turn OFF the gate in line circuit LC89. The code lead potentials at this time hold the transistor gate ON in the other line circuits. Common control next selects an intercom trunk such as 114-1; it causes this trunk circuit to mark one of its C lead network appearances and also causes line circuit LC89 to mark its C lead appearance. The network now completes a path between called line circuit LC89 and the marked network appearance of intercom trunk circuit 114-1.

Next, the output of the register is removed from the code leads, and the gates in all line circuits are now held ON by a potential applied to the F lead. Common control now causes the register to apply a negative call-back potential to its trunk side S lead, through the network, to the S lead of the calling line circuit. This initiates a new line scanning operation and turns the gate of line circuit LC10 OFF when it is scanned. The register now releases, line circuit LC10 marks its C lead network appearance, and the other C lead appearance of the intercom trunk circuit is marked by common control. The network responds to these marks and completes a connection from the calling station ST10, via trunk circuit 114-1, to called station ST89.

Serving of a Call That Requires Pickup Service

The following describes the manner in which the system of FIGS. 1A, 1B, and 1C serve a call that requires pickup service. It is assumed that the call is initially directed to station ST11. It is further assumed that the call is not answered at this station and that station ST10 answers the call by means of a call pickup operation in accordance with the present invention.

The user at station ST10 initiates a call pickup operation by removing his handset and dialing the assigned pickup code. The system responds to the off-hook condition of the subset and causes line circuit LC10 to be connected with the trunk side network appearance of register 128. The dialed digits representing the pickup code are translated by the translator portion 128A of the register which transmits a signal over conductor CPUC from FIG. 1A to FIG. 1C to indicate to common control that the call pickup code has been dialed. By means of call-back control 104, common control initiates a register call-back operation as described in the Abbott et al. patent. The function of the register call-back operation is to identify the line circuit that is currently connected to the register — in this case, line circuit LC10 which is requesting call pickup service. Common control initiates the call-back operation by applying a signal to conductor CB extending to the register. This causes the register to apply a negative potential to its trunk side sleeve lead appearance. This negative potential is extended through the network to the sleeve lead of line circuit LC10 where it causes the gate of this line circuit to turn OFF when it is subsequently scanned.

Common control next causes line scanner 116 to initiate a line scanning operation to identify the requesting line circuit. The gate of line circuit LC10 turns OFF when the line circuit is scanned; the turn-OFF of the gate drives conductors SL10 and L10 HIGH. The HIGH on conductor L10 is extended to the left side of the station-to-group assignment field 123 on FIG. 1B. The left-hand column of terminals are each associated with one of conductors L10 through L89. The right-hand column of terminals are associated with the conductors extending to the various ones of call pickup circuits 122-0 through 122-9. The left side terminals are cross-connected to the right side terminals in accordance with the grouping of the line circuits.

As earlier mentioned, all stations of the PBX that are to be provided with call pickup service are subdivided into groups so that each station may pick up calls for other stations in the same group. The present drawing discloses ten call pickup circuits 122-0 through 122-9 and, therefore, the disclosed PBX may have call pickup service for ten different groups of stations. Conductors L10 and L11 from line circuits LC10 and LC11 extend by means of the station-to-group assignment field 123 into call pickup circuit 0. The L- conductor from other line circuits may also be extended to call pickup circuit 0 if desired. Other line circuits including line circuit LC89 are associated with call pickup circuit 9 by means of the station assignment field.

With the indicated association between the L- conductors and the call pickup circuits, it is apparent that stations ST10 and ST11 are associated with the same call pickup group, namely, call pickup group 0. Therefore, either of these stations may pick up calls directed to any station of group 0.

As described subsequently in detail in connection with FIGS. 2, the HIGH on conductor L10 when the line circuit LC10 is scanned on a register call-back operation transmits a signal to call pickup group 0 to set flip-flop 109. The setting of this flip-flop indicates that a station in call pickup group 0 is attempting to pick up a call directed to another station in the same group.

Next, common control responds to the high on conductor SL10 and causes all of the trunk circuits to be scanned to determine which trunk circuits are currently in a ringing condition. The trunk circuits are scanned by scanner 111 which applies scan signals to its output conductors TS0 through TS9. These conductors extend to trunk circuits 114-0 through 114-9, respectively. As a scanning potential is applied to each conductor, circuitry internal to the scanned trunk circuit determines whether the trunk circuit is currently in a ringing condition. If the circuit is in a ringing condition, it applies an output signal to its conductor SL-. Thus, if trunk circuit 114-9 is in a ringing condition when a scanning potential is applied to conductor TS9, it applies a potential to conductor SL9 extending back to common control. In response to the receipt of this signal, common control momentarily terminates the operation of scanner 111 and initiates the circuit operations required to determine whether the trunk circuit is connected to a called line circuit in the same pickup group as that of the requesting station. If common control does not receive a signal on an SL- conductor when it scans a trunk circuit, scanner 111 continues until a trunk circuit in a ringing condition is found.

Let is next be assumed that trunk circuit 9(114-9) is scanned and is in a ringing condition. In this case, the circuit returns a signal on conductor SL9 to gate 5 within common control of FIG. 1C. Gate 5 applies a signal to pulser 124 which generates an output pulse to suspend the operation of ringing trunk scanner 111 for the period of time required for common control to determine whether trunk circuit 9 is connected to a line circuit in the same pickup group as that of the requesting station.

Let it be assumed that trunk circuit 9 is currently connected to line circuit LC89. During the interval defined by the output pulse from pulser 124, common control and scanner control 111A apply a potential to conductor RTE extending to all trunk circuits. This signal causes the trunk circuit that is being scanned, namely trunk circuit 9, to initiate a call-back operation as subsequently described in detail in connection with FIGS. 2. At this time, the trunk circuit applies a negative potential to its sleeve lead network appearance. This potential is extended through the network to the sleeve lead of the line circuit LC89.

Common control now initiates a line scanning operation by scanner 116. The gate in line circuit LC89 turns OFF because of the negative call-back potential when it is scanned. The turn-OFF of the gate transmits a HIGH potential over conductor L89, via the assignment field 123, to the call pickup circuit 9. The receipt of this signal by pickup circuit 9 has no effect on common control since the requesting station, namely station ST10, is in pickup group 0.

Subsequently, the output from pulser 124 terminates and ringing trunk scanner 111 resumes its operation. Let it be assumed that the next trunk that is scanned is trunk circuit 0; let it further be assumed that trunk circuit 0 is currently connected to line circuit LC11 and is, therefore, serving the call that station ST10 is attempting to pick up. When trunk circuit 0 is scanned, it returns a signal on conductor SL0 indicating that it is currently in a ringing condition. In response to the receipt of this signal, pulser 124 suspends the ringing trunk scanning operation momentarily and initiates a call-back operation by the trunk circuit. During this call-back operation, line scanner 116 is activated and begins a line scanning operation to identify the line circuit connected to trunk circuit 0. Since line circuit LC11 is assumed to be connected to trunk circuit 0, the line circuit applies a signal to its conductor L11 when it is scanned. This signal is applied, via the assignment field 123, to call pickup circuit 0. Since flip-flop 109 in pickup circuit 0 was priorly set (when station ST10 dialed the call pickup code), AND gate GSS is now activated, as subsequently described, and transmits an output signal to gate SRTS. This gate, in turn, transmits a signal over conductor SRTS to common control. The receipt of this signal indicates that trunk circuit 0 is currently connected to a station that is assigned to the same call pickup group (group 0) as that of requesting station ST10.

As subsequently described in detail in connection with FIGS. 2, common control (1) initiates the circuit actions required to release the network connection between trunk circuit 0 and line circuit LC11; (2) initiates another call-back operation from the register followed by a line scanning operation to identify the requesting line; and (3) causes both trunk circuit 0 and the requesting line to mark their respective C- lead network appearances. The network responds to the marking potential applied by line circuit LC10 and trunk circuit 0 and completes a path between these two circuits. Once this path is completed, the call is effectively extended to line circuit 10 so it may answer the call in the same manner as if the call had been initially directed to it.

Detailed Description — FIGS. 2A, 2B, 2C, 2D, and 2E

Drawing FIGS. 2 illustrate additional details of my invention. The various equipments, such as line circuits, trunk circuits, switching network, call pickup circuits, common control, etc., are oriented with respect to each other on FIGS. 2 in a manner analogous to that of FIGS. 1. Also, the elements on FIGS. 1 having a direct correspondence with an element on FIGS. 2 are designated in a manner that facilitates an appreciation of the correspondence. Elements on FIGS. 1 that have an alpha-numerical designation have a corresponding alpha-numerical designation on FIGS. 2. Thus, line circuit ST10 on FIG. 1A corresponds to line circuit ST10 on FIG. 2A. Elements on FIGS. 1 that have a numerical designation have a designation on FIGS. 2 that is high by a count of 100. Thus, switching network 112 on FIG. 1A corresponds to switching network 212 on FIG. 2A.

The description of FIGS. 2 is made with reference to the same call conditions assumed for FIGS. 1; namely, that a call is initially directed to station ST11 whose user is not available to answer the call; that stations ST11 and ST10 are in the same call pickup group, namely, pickup group 0; and that station ST10 dials the pickup code to answer the call directed to station ST11. It is also assumed that trunk circuit 0 is serving the call.

Station ST10 initiates the actions required to pick up the call by going off-hook and by dialing the pickup code. When the off-hook condition is detected, line circuit LC10 is connected by the network to the trunk side appearance of the register. As described in detail in the Abbott et al. patent, the register supplies dial tone to the station, registers the dialed digits, and translates the required digits. The register also contains facilities for providing a special signal to common control in the event that the dialed digits represent a request for a special service. In addition to call pickup service, other examples of special service are the dialing of a prefix digit 0 to request a connection to an operator, the dialing of a prefix digit 9 for an outgoing call, etc. For the present call, the call pickup code detector 228B of the register detects the dialing of the pickup code and applies a LOW or ground potential to conductor CPUC which extends from the register on FIG. 2A to common control on FIG. 2D. The receipt of this LOW signal initiates the circuit operations described in the subsequent paragraphs.

Figures 2A, 2E:
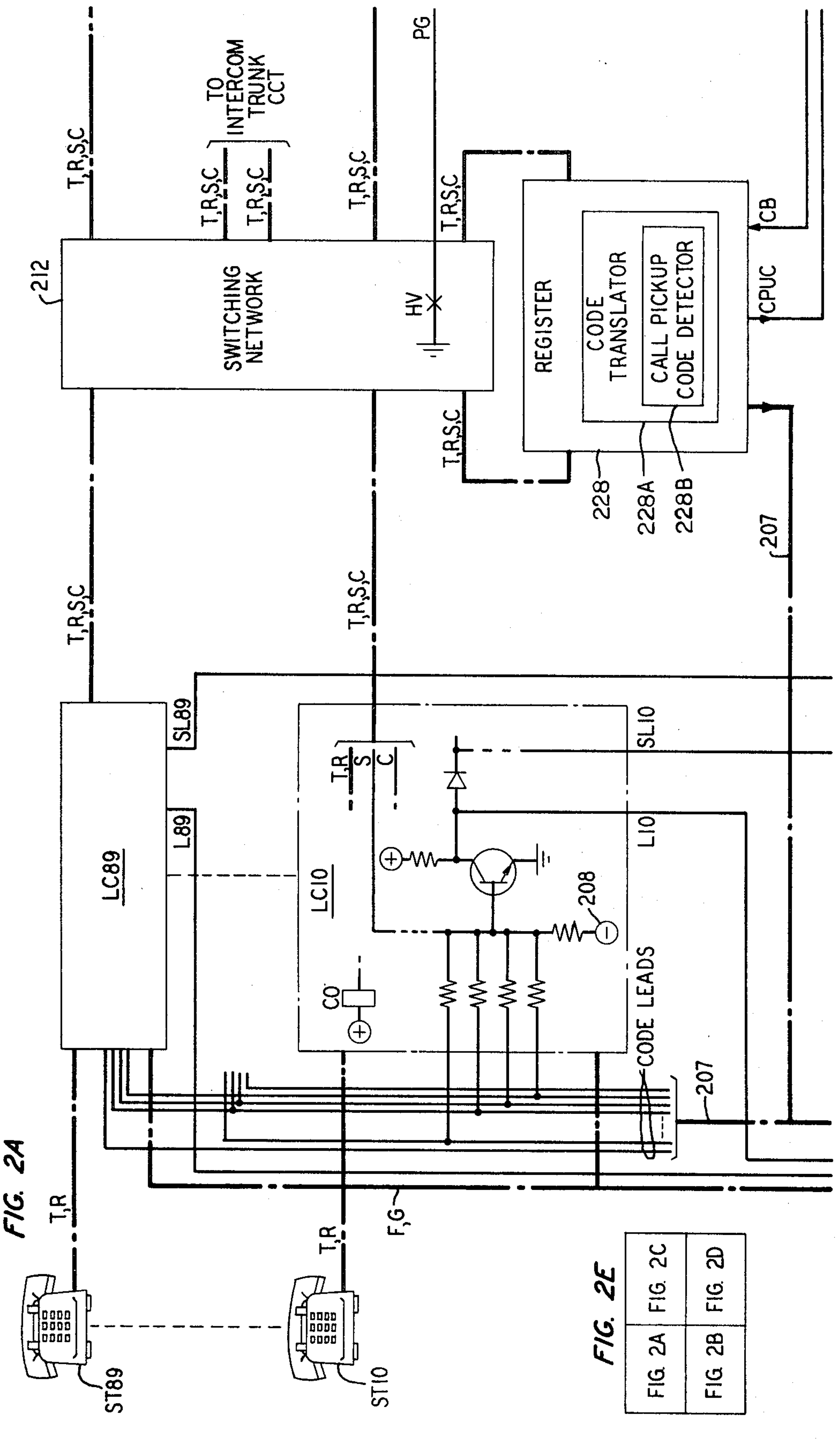
Figure 2B:
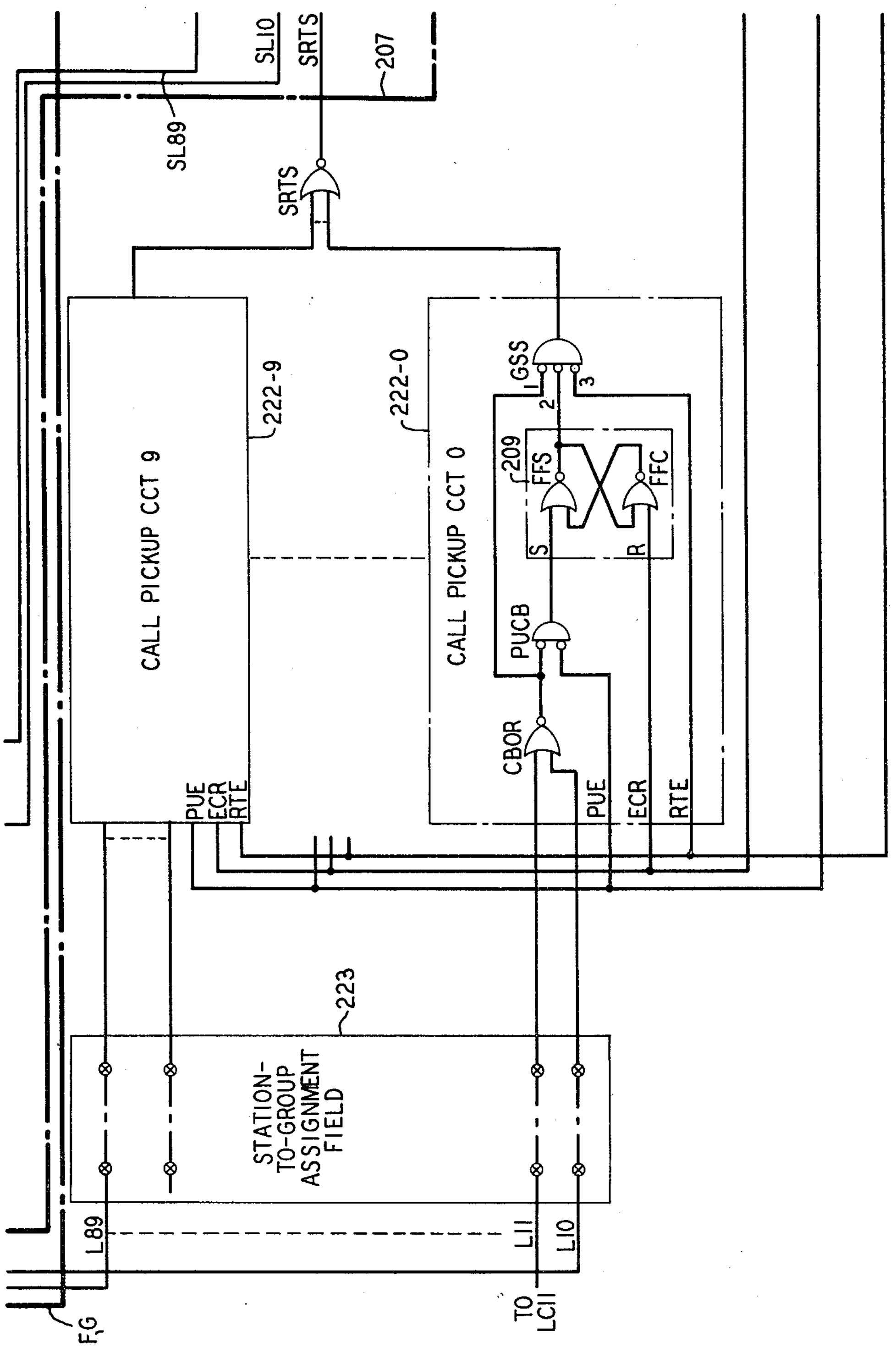
Figure 2C:
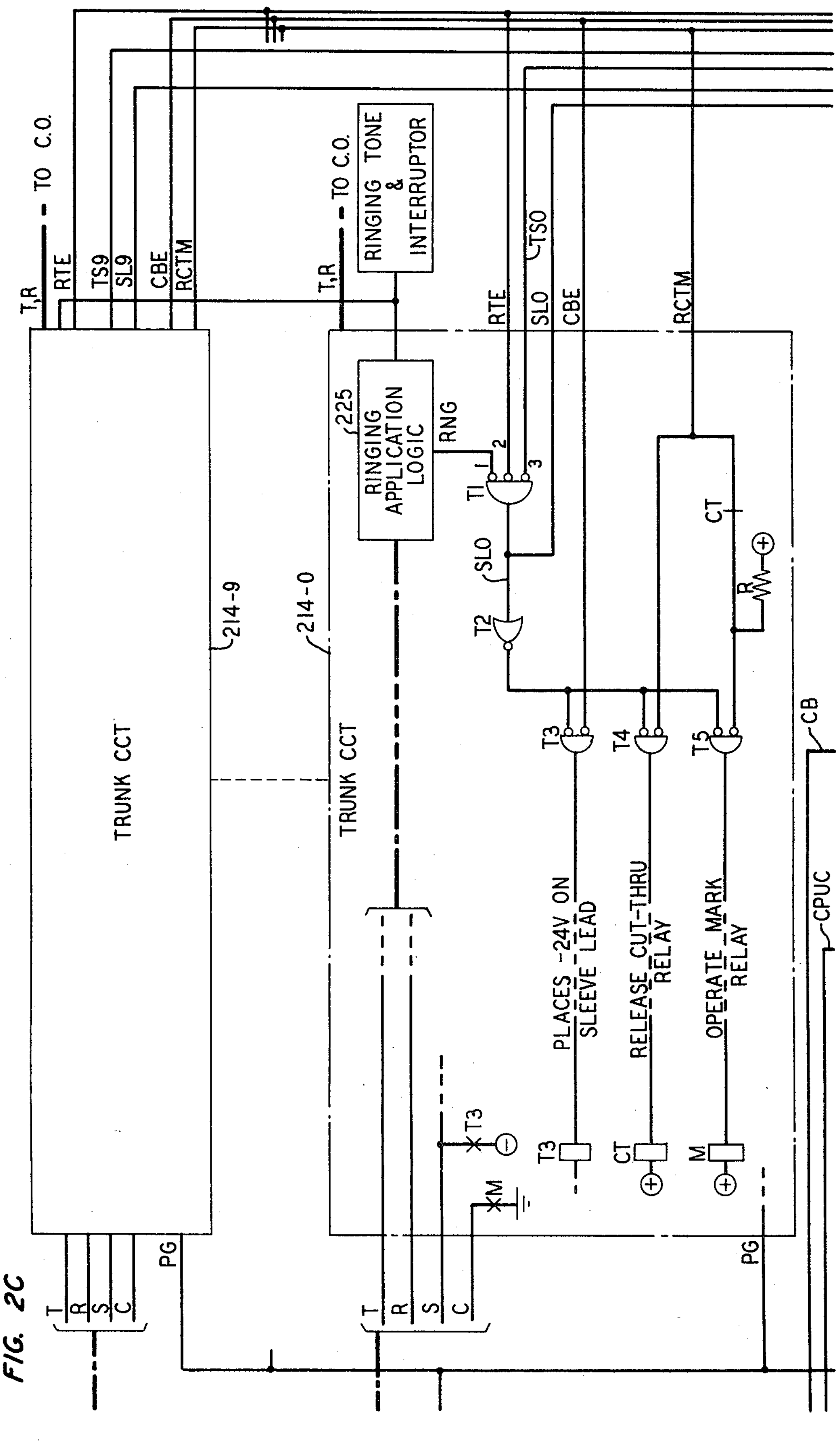
Figure 2D:
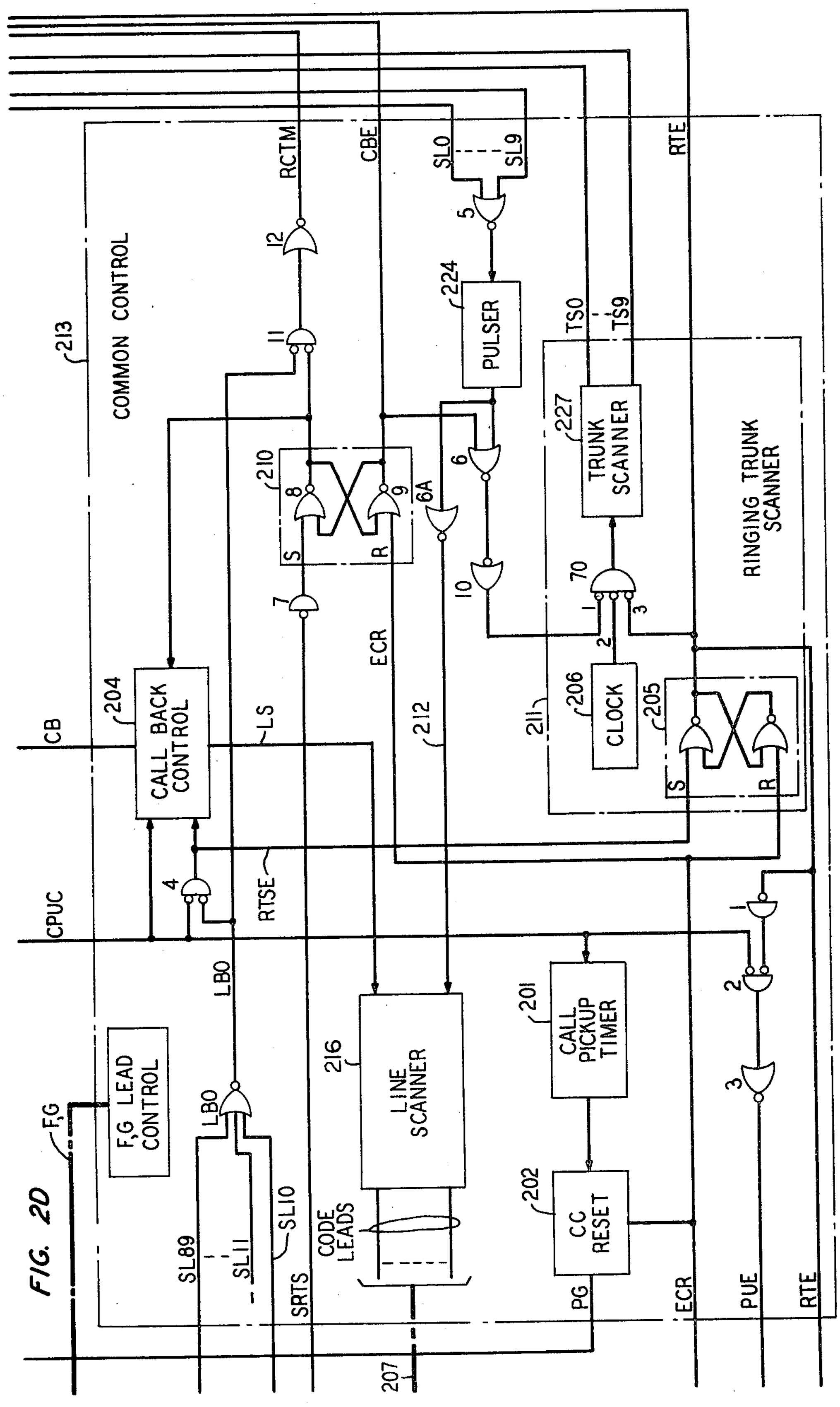

On FIG. 2D, the LOW on conductor CPUC is extended (1) to the input of the call-back control 204, (2) to the upper input of AND gate 4, (3) to the upper input of AND gate 2, and (4) to the input of the call pickup timer 201. The receipt of the LOW by the upper input of AND gate 2 causes the gate to turn OFF and generate a HIGH at its output. Gate 2 turns OFF at this time since its low input also currently has a LOW applied to it from the output of gate 1. The input of gate 1 is HIGH at this time since it is connected to the output of the upper portion of flip-flop 205 which is currently in a reset condition in which its upper gate is in an OFF state while its lower gate is in an ON state. The HIGH on the output of AND gate 2, when it turns OFF, is inverted by gate 3 and applied as a LOW to conductor PUE. This conductor extends from FIG. 2D to the call pickup circuits on FIG. 2B. With respect to call pickup circuit 0, which is shown in detail, the LOW potential on conductor PUE is applied to the lower input of AND gate PUCB. The same LOW potential is applied to the PUCB gate of all remaining call pickup circuits (which are not shown in detail on FIG. 2B). The LOW on the lower input of gate PUCB partially primes the gate so that its conductive state is under the control of the signals subsequently applied to its upper input.

The receipt by call-back control 204 of the LOW on conductor CPUC initiates two separate circuit operations. First of all, it applies a signal to conductor CB extending from call-back control 204 to the register. This causes the register to initiate a call-back operation in which it applies a negative potential to the sleeve lead of its trunk side appearance. This potential is extended via the network to the sleeve lead of line circuit LC10. This negative potential permits the transistor gate of line circuit LC10 to turn OFF when it is subsequently scanned.

The receipt of the LOW potential on conductor CPUC by call-back control 204 also causes that circuit to transmit a signal over conductor LS to line scanner 203 which now begins a scanning of the line circuits. The transistor gate of line circuit LC10 is ON at the beginning of the scanning operation, as described in the Abbott et al. patent, and then turns OFF when scanner 216 scans the line circuit by grounding all of code leads 207 unique to the line circuit. There are a plurality of code leads and, of this plurality, there is a unique combination of four code leads which are associated with and which extend to each line circuit. A line circuit is said to be scanned when the scanner grounds the combination of code leads unique to the line circuit.

Conductors SL10 and L10 go HIGH as the gate of line circuit LC10 turns OFF when the line circuit is scanned. The HIGH on conductor L10 is extended, via the cross-connection field 223, to an input of gate CBOR within call pickup circuit 0. Conductor PUE is LOW at this time, as already described. The HIGH on conductor L10 generates a LOW at the output of gate CBOR. This extends a LOW to the upper input of gate PUCB. Since both inputs of this gate are now LOW, the gate turns OFF, drives its output HIGH, and switches flip-flop 209 to a set condition. The output of gate FFS of the flip-flop now goes LOW into input 2 of gate GSS. At this time, the output of gate GSS does not change since its input 3 remains HIGH.

A HIGH also appears on conductor SL10 when the transistor gate of line circuit LC10 turns OFF as it is scanned. The HIGH on this conductor is applied to an input of gate LBO and it causes the output of the gate to go LOW. The lower input of AND gate 4 is driven LOW at this time since it is connected to the output of gate LBO. The upper input of AND gate 4 is LOW at this time since it is connected to conductor CPUC which, as already mentioned, went LOW upon the detection of the dialing of the pickup code. Since both inputs of AND gate 4 are LOW, the gate turns OFF and drives its output HIGH. The HIGH on its output is extended to an input of call-back control 204 to cause that circuit to remove the call-back control potential from conductor CB extending to the register 228. This terminates the call-back operation by the register and, specifically, causes that circuit to remove the negative potential from its trunk side sleeve lead. The HIGH on the output of gate 4 is also extended over conductor RTSE to the upper input of flip-flop 205. This HIGH switches the flip-flop to a SET state to drive the output of the upper gate LOW. The output of this gate is connected to conductor RTE which extends (1) to all trunk circuits of FIG. 2C, (2) to input 3 of gate 70 in the ringing trunk scanner 227, (3) to the call pickup circuits of FIG. 2B, (4) and to the input of gate 1 of FIG. 2D.

When lead RTE goes LOW to the input of gate 1, the output of the gate goes HIGH to the lower input of AND gate 2 to turn that gate ON. This causes the output of gate 2 to go LOW to the input of gate 3 and, in turn, causes the output of gate 3 to go HIGH. The output of gate 3 is connected to conductor PUE which extends to the call pickup circuits. Conductor PUE going HIGH into gate PUCB turns that gate ON so that it can no longer respond to signals on its upper input. Flip-flop 209 remains set and constitutes an indication that the requesting line is in call-back group 0.

Conductors SL0 through SL9 on FIG. 2D are normally LOW into the input of gate 5 so that the output of the gate is normally HIGH to pulser 224. The pulser's output is normally LOW to the lower input of gate 6. The output of gate 9 of flip-flop 210 is normally LOW into the upper input of gate 6. The output of gate 6 is, therefore, normally HIGH into the input of gate 10 which, in turn, applies a LOW to input 1 of gate 70. Input 3 of gate 70 is currently LOW from conductor RTE. With its inputs 1 and 3 LOW, the conductive state of gate 70 is under control of the output signals from clock 206 which are applied to its input 2. The clock is of the continually running type and, therefore, the application of the LOW potential to input 3 of gate 70 from conductor RTE permits the gate to respond to the clock pulses. The gate inverts the clock pulses and applies them to the input of trunk scanner 227. The outputs of this scanner are designated TS0 through TS9, they are connected to trunk circuits 0 through 9, respectively, and they comprise the scan leads for the trunk circuits.

Scanner 227 now scans the trunk circuits in order to determine which trunk circuit is currently in a ringing condition. The scanning operation is performed in a manner analogous to the line scanning operation by scanner 216. Namely, the output conductors TS0 through TS9 of trunk scanner 227 are normally HIGH except that each conductor is LOW when the scanner is in an operative position associated with the conductor. In other words, when trunk 0 is scanned, a LOW is applied to trunk scan conductor TS0 which extends from the output of scanner 227 on FIG. 2D to trunk circuit 0 on FIG. 2C. Conductor TS0 is connected to input 3 of AND gate T1 in the trunk circuit and, therefore, input 3 of gate T1 is LOW whenever its trunk circuit is scanned. Input 2 of the AND gate is LOW at this time since it is connected to conductor RTE which is LOW by virtue of flip-flop 205 being currently in a set state.

The LOW on conductor RTE is also extended to input 3 of gate GSS within call pickup circuit 0. This potential, together with the LOW potential on input 2 from the output of flip-flop 209, primes inputs 2 and 3 of the gate and puts its conductive state under control of input 1 which is connected to the output gate CBOR.

With reference to trunk circuit 0, it has already been explained: (1) how a ground is applied to input 3 of gate T1 by conductor TS0 as the trunk circuit is scanned, (2) how a ground is applied to input 2 of gate T1 from conductor RTE since flip-flop 205 is in a set state, and (3) how a ground on these two inputs effectively puts the conductive state of gate T1 under control of the signals applied to its input 1. By means well known in the art circuit element 225 is activated whenever its trunk circuit applies ringing potential to the call it is currently serving. Element 225 normally applies a HIGH potential to its output conductor RNG; but whenever ringing potential is applied to a call connection, the potential on conductor RNG switches from a HIGH to a LOW. Since conductor RNG is connected to input 1 of gate T1, and since inputs 2 and 3 of the gate are LOW at this time, gate T1 turns OFF whenever the trunk circuit applies ringing to called station 11 (to which this trunk circuit is assumed to be connected at this time).

The turn-OFF of gate T1 applies a HIGH from its output to the input of gate T2 as well as to conductor SL0 which extends from the output of gate T1 back to the input of gate 5 on FIG. 2D. The application of the HIGH to gate T2 drives its output LOW extending to the upper inputs of each of gates T3, T4, and T5 of the trunk circuit.

The application of the HIGH potential to the input of gate 5 drives into output LOW which extends to the input of pulser 224. The pulser is activated by the receipt of this LOW potential and generates a positive output pulse of a predetermined duration. As subsequently described, the pulse persists for a period of time required for line scanner 216 to scan all of the line circuits to determine which line circuit is currently connected to the trunk circuit 0, which is currently in a ringing condition and is currently being scanned by trunk scanner 227.

The upper input of gate 6 on FIG. 2D is currently at a LOW potential since it is connected to gate 9 of flip-flop 210 which is in its reset state. Therefore, the application of the positive pulse to the lower input of gate 6 by the pulser 224 turns the gate ON and drives the output of the gate LOW. This LOW is extended to the input of gate 10. The LOW on the input of gate 10 is inverted and applied as a HIGH to input 1 of gate 70. This HIGH holds the gate ON for the pulse duration and, during this interval, effectively prevents the gate from responding to the output pulses of clock 206. Thus, the trunk scanning operation is suspended for the period of time the pulse generated by pulse generator 224 persists and holds the upper input of gate 70 HIGH.

Lead CBE extending from FIG. 2D to the trunk circuits of FIG. 2C is currently LOW since flip-flop 210 is in a reset state. The LOW on conductor CBE, together with the LOW from the output of gate T2 in trunk circuit 0, causes a LOW to be applied to both inputs of gate T3. This turns the gate OFF and, in turn, operates relay T3 which closes its make contacts to apply a negative potential to the sleeve lead network appearance of the trunk circuit. This negative potential is extended back through the switching network to the sleeve lead of the line circuit to which the trunk circuit is currently connected. It has been assumed that trunk circuit 0 is currently connected to line circuit LC11 and, therefore, the receipt of this negative potential on the sleeve lead of line circuit LC11 primes its gate so that it may subsequently switch from an ON to an OFF state as already described in connection with the call-back operation from the register.

In order to describe all aspects of my invention, let it briefly be assumed that the first trunk circuit that is scanned and in a ringing condition is not trunk circuit 0 but is, instead, some other trunk circuit such as trunk circuit 9. Let it further be assumed that trunk circuit 9 is currently connected to a line circuit such as line circuit LC89, which is not in the same call pickup group as that of the requesting station ST10. With these assumed conditions, the scanning of trunk circuit 9 returns a LOW signal on conductor SL9 to activate the pulser as already described. This inhibits the trunk scanner 227 for the pulse duration and initiates a line scanning operation by means of the signal applied from the output of gate 6A over conductor 212 to line scanner 216. This LOW signal is generated when gate 6A inverts the output of the pulser 224.

Gate T3 of trunk circuit 9 operates its relay T3 to apply a negative call-back potential via the switching network to the sleeve lead of line circuit LC89 which is assumed to be connected at this time to trunk circuit 9. The gate of line circuit LC89 switches from an ON to an OFF condition when the line circuit is scanned. This applies a HIGH potential over conductor L89 to the cross-connection field 223 on FIG. 2B. From there, the HIGH is applied to the gate corresponding to CBOR in call pickup circuit 9. This signal produces no further circuit actions in call pickup circuit 9 since its flip-flop, corresponding to flip-flop 209 for call pickup circuit 0, was not set in response to the dialing of the pickup code at station 10. Therefore, the turn-OFF of the gate of the line circuit LC89 produces no further circuit action insofar as the currently described call pickup operation is concerned.

Subsequently, the pulser times out, terminates its output pulse, and restores its output conductor a normally LOW potential. This LOW permits gate 6 to turn OFF, and gate 10 to turn ON and drive its output LOW. This LOW extends to input 1 of gate 70 where it once again puts the conductive state of the gate under the control of the clock pulses 206. This causes the trunk scanner 227 to resume its trunk scanning operation.

Subsequently, the trunk scanner encounters another trunk that is in a ringing condition and stops when a signal is received from the SL- conductor of that trunk. Let it be assumed at this time that the next trunk circuit that is scanned and in a ringing condition is trunk circuit 0. Let it further be assumed that trunk circuit 0 is currently connected to line circuit LC11, which as already mentioned, is receiving the call that station ST10 is attempting to pick up. This being the case, when trunk circuit 0 is scanned, its gate T1 turns OFF and returns a HIGH signal on conductor SL0 to gate 5 on FIG. 2D. Also, the HIGH on conductor SL0 is inverted by gate T2 and applied as a LOW to gate T3 to turn it OFF. This operates relay T3 which places a negative call-back potential on the sleeve lead of its trunk circuit. This potential is applied, in turn, via the switching network to the sleeve lead of line circuit LC11 to cause it to turn OFF when the line circuit is subsequently scanned.

The reception of the HIGH potential by gate 5 activates the pulser which again temporarily suspends the operation of trunk scanner 227 and initiates a call-back line scanning operation by means of line scanner 216. The ate of line circuit LC11 turns OFF when the line circuit is scanned and drives its conductor L11 HIGH. This conductor extends via the cross-connection field 223 to the input of gate CBOR of call pickup circuit 0. This HIGH drives the output of gate CBOR LOW and, in turn, drives input 1 of gate GSS LOW. Input 3 of gate GSS is LOW since flip-flop 205 is currently in a set state; input 2 of gate GSS is currently LOW since flip-flop 209 is currently in a set state; and input 1 is driven LOW when line circuit LC11 is scanned. The LOW on all three inputs of the gate GSS causes it to switch to an OFF state which drives its output HIGH. This HIGH is inverted by gate SRTS and is applied as a LOW to the input of gate 7 on FIG. 2D. This low is inverted by gate 7 and applied as a HIGH to switch flip-flop 210 to a set state. The setting of this flip-flop functionally indicates to common control that the currently scanned trunk circuit is connected to a line circuit that is in the same call pickup group as that of requesting station ST10.

The switching of flip-flop 210 to its set state drives conductor CBE HIGH. This HIGH is inverted by gate 6 and again inverted by gate 10 so that a HIGH is applied to the upper input of gate 70 to disable it and maintain the suspension of the trunk scanning operation. The HIGH on conductor CBE also extends to the lower input of AND gate T3 in trunk circuit 0 to turn that gate ON, release relay T3, and terminate the call-back operation.

When called line circuit LC11 is scanned on the call-back operation trunk gate T3, its SL11 lead goes HIGH to gate LBO of FIG. 2D. This causes the output of gate LBO to apply a LOW to the input of gate 11. The lower input of gate 11 is LOW at this time since flip-flop 210 is in a set state. With the LOW on both of its inputs, gate 11 turns OFF and drives its output HIGH to the input of gate 12. Gate 12 inverts the HIGH and applies a low to conductor RCTM extending to all trunk circuits. Conductor RCTM going LOW to the trunk circuits that are not being scanned has no effect on them since the T1 gate of each of these trunk circuits is not OFF at this time. Therefore, the output of gate T1 in all these trunk circuits is LOW into gate T2 causing the output of gate T2 to be HIGH to gates T3, T4, and T5. This inhibits these gates and prevents them from responding to the signals applied to their lower inputs (conductors CBE and RCTM).

However, trunk circuit 0, which is now being scanned, has all of its inputs to gate T1 LOW. The output of gate T1 is therefore HIGH to gate T2 which, in turn, drives the upper inputs of gates T3, T4, and T5 LOW. This LOW on the upper input of gate T3, together with the LOW on conductor CBE, causes gate T3 to turn OFF. This operates relay T3 which applies a negative call-back potential from the trunk circuit back to line circuit LC11, as already described. The LOW on the upper input of gate T4, together with the LOW on the lower input of the gate from conductor RCTM, turns gate T4 OFF which, in turn, releases the cut-through relay CT. When this relay releases, its contact CT closes and connects lead RCTM to the lower input of gate T5. Previously, that input of the gate was held HIGH by resistor R. This held the output of the gate LOW. However, with lead RCTM being LOW and being connected to the input of the gate, the gate turns OFF, drives its output HIGH, and operates the M relay of the trunk circuit. This causes a marking potential to be applied to the C lead network appearance of the trunk circuit.

The output of gate 8 of flip-flop 210 going LOW to the call-back control circuit 204 reinitiates the call-back sequence from register 228 which is still connected to requesting line circuit LC10. The call-back control circuit also activates line scanner 216 over conductor LS. When the requesting line circuit LC10 is identified on the call-back line scanning operation, common control causes a marking potential to be placed on the C lead network appearance of the line circuit. (The connection between trunk circuit 0 and line circuit LC11 was released by the network in response to the release of cut-through relay CT.) Now, with the mark applied to the network appearance of both line circuit LC10 and trunk circuit 0, the network responds in the manner described in the Abbott et al. patent to complete a network connection between these two circuits.

After this connection is completed, conductor PG is driven LOW by the network and this LOW extends to all trunk circuits and to common control. Lead PG going LOW to common control activates the common control reset element 202. This applies a positive signal to conductor ECR which resets flip-flop 210 and 205 in common control, as well as flip-flop 209 in call pickup circuit 0.

The function of call pickup timer 201 is to place a limit on time devoted to an attempted call pickup operation so that the common control will be reset after a predetermined time in the event that the call pickup operation cannot be successfully accomplished. This condition would occur in the event that a call pickup code is dialed by a station assigned to a group whose line circuits are not currently being called. After this predetermined time, the call pickup timer 201 generates an output pulse which is received by the reset circuit 202 which, in turn, resets the various flip-flops within common control and the pickup circuits to restore the circuit to normal so that it is free to serve other calls.

What is claimed is:

1. In a switching system, a switching network having a line side and trunk side, a plurality of line circuits arranged into a plurality of groups and connected to said line side, a plurality of trunk circuits connected to said trunk side, a plurality of stations each of which is connected to a different one of said line circuits, a plurality of call pickup circuits each of which is unique to a different one of said groups, means responsive to the dialing of a pickup code at a station connected to a requesting one of said line circuits for transmitting a pickup request signal to the pickup circuit for said requesting line circuit, means further responsive to the dialing of said pickup code for initiating a scanning of said trunk circuits, a system controller, means responsive to the scanning of a trunk circuit currently in a ringing condition for transmitting an identification signal to the pickup circuit associated with the called line circuit currently connected to said last named trunk circuit, and means including said last named pickup circuit responsive to the receipt of said identification signal for indicating to said system controller whether said called line circuit and said requesting line circuit are in the same group.

2. In a switching system, a switching network having a line side and a trunk side, a plurality of line circuits arranged into a plurality of groups and connected to said line side, a plurality of trunk circuits connected to said trunk side, a plurality of stations each of which is connected to a different one of said line circuits, a plurality of call pickup circuits each of which is unique to a different one of said groups, memory means in each of said pickup circuits, each of said memory means having a normal and a set state, means responsive to the dialing of a pickup code at a station connected to a requesting one of said line circuits for switching to a set state the memory means of the pickup circuit for the group of said requesting line circuit, means further responsive to the dialing of said pickup code for initiating a scanning of said trunk circuits, a system controller, means responsive to the scanning of a trunk circuit currently in a ringing condition for transmitting an identification signal to the pickup circuit associated with the called line circuit currently connected by said network to said scanned trunk circuit, and means including the memory means of said last named pickup circuit responsive to the receipt of said identification signal for indicating to said system controller whether said called line circuit and said requesting line circuit are in the same group.

3. The system of claim 2 in combination with means responsive to an indication that the called line circuit and said requesting line circuit are not in the same group for scanning additional ones of said trunk circuits until a trunk circuit is scanned that is in a ringing condition and is currently connected to a called line circuit in the same group as that of said requesting line circuit.

4. The system of claim 3 in combination with means responsive to an indication that said called line circuit and said requesting line circuit are in the same pickup group for releasing the network connection between the currently scanned trunk circuit and said called line circuit and for establishing a connection from said scanned trunk circuit to said requesting line circuit.

5. The system of claim 2 wherein said means responsive to the dialing of a pickup code for switching said memory means to a set state comprises, a register connected to said trunk side, means for detecting the dialing of said pickup code, means responsive to said detection for applying a register call-back signal from said register and through said network to said requesting line circuit, a line scanner responsive to said detection and to the application of said call-back signal for scanning said line circuits to identify said requesting line circuit, and means responsive to said identification for transmitting a pickup request signal from said requesting line circuit to its associated pickup circuit to switch the memory means therein to a set state.

6. The system of claim 5 wherein said means for initiating the scanning of said trunk circuits comprises, a ringing trunk circuit scanner in said system controller, and means responsive to the reception of said pickup request signal by the pickup circuit of said requesting line circuit for transmitting a signal to said system controller to initiate the operation of said ringing trunk circuit scanner.

7. The system of claim 6 wherein said means for transmitting an identification signal comprises, means responsive to the scanning of a trunk circuit currently in a ringing condition for suspending the operation of said trunk circuit scanner for a predetermined time duration, means responsive to the scanning of said trunk circuit for applying a trunk call-back signal from said scanned trunk circuit to said called line circuit, means responsive to said suspension of operation and to said trunk call-back signal for causing said line scanner to scan said line circuits to identify said called line circuit, means responsive to the identification of said called line circuit for transmitting said identification signal to the call pickup circuit associated with said called line circuit, and means responsive to the receipt of said identification signal when the memory element of said last named pickup circuit is in a set state for indicating to said system controller that said called line circuit and said requesting line circuit are in the same group.

8. The system of claim 7 in combination with means responsive to the receipt of said indication that said called line circuit and said requesting line circuit are in the same group for terminating the operation of said trunk scanner, and means effective if said called line circuit and said requesting line circuit are not in the same group for reinitiating the operation of said trunk circuit scanner.

9. In a switching system, a switching network having a line side and a trunk side, a plurality of line circuits arranged into a plurality of groups and connected to said line side, a plurality of trunk circuits connected to said trunk side, a plurality of stations each of which is connected to a different one of said line circuits, call pickup circuitry, means responsive to the dialing of a pickup code at a station connected to a requesting one of said line circuits for transmitting a pickup request signal to said call pickup circuitry, means in said circuitry for registering an indication of the group number of said requesting line circuit, means further responsive to the dialing of said pickup code for initiating the scanning of said trunk circuits, a system controller, means responsive to the scanning of a trunk circuit currently in a ringing condition and connected to a called one of said line circuits for transmitting and identification signal to said pickup circuitry, and means in said circuitry responsive to the receipt of said identification signal for indicating to said system controller whether said called line circuit and said requesting line circuit are in the same group.

10. The system of claim 9 in combination with means responsive to the receipt of an indication that said called line circuit and said requesting line circuit are not in the same group for scanning additional ones of said trunk circuits until a trunk circuit is scanned that is in a ringing condition and is currently connected to a line circuit in the same group as that of said requesting line circuit.

11. The system of claim 10 in combination with means responsive to an indication that said called line circuit and said requesting line circuit are in the same pickup group for releasing the network connection between the currently scanned trunk circuit and said called line circuit and for establishing a connection from said scanned trunk circuit to said requesting line circuit.

12. The system of claim 9 wherein said means responsive to the dialing of a pickup code for transmitting a pickup request signal comprises, a register connected to said trunk side, means for detecting the dialing of said pickup code, means responsive to said detecting for applying a register call-back signal from said register and through said network to said requesting line circuit, a line scanner responsive to said detecting and to the application of said call-back signal for scanning said line circuits to identify said requesting line circuit, and means responsive to said identification for transmitting said pickup request signal from said requesting line circuit to said pickup circuitry.

13. The system of claim 12 wherein said means for initiating the scanning of said trunk circuits comprises, a ringing trunk circuit scanner in said system controller, and means responsive to the reception of said pickup request signal by said pickup circuitry for transmitting a signal to said system controller to initiate the operation of said ringing trunk circuit scanner.

14. The system of claim 13 wherein said means for transmitting an identification signal comprises, means responsive to the scanning of a trunk circuit currently in a ringing condition for suspending the operation of said trunk circuit scanner for a predetermined time duration, means responsive to the scanning of said trunk circuit for applying a trunk call-back signal from said scanned trunk circuit to said called line circuit, means responsive to said suspension of operation and to said trunk call-back signal for causing said line scanner to scan said line circuits to identify said called line circuit, and means further responsive to the identification of said called line circuit for transmitting said identification signal to said call pickup circuitry, said pickup circuits being responsive to the receipt of said identification signal for determining whether the group number of said called line circuit is the same as the group number of said requesting line circuit.

15. The system of claim 14 in combination with means for terminating the operation of said trunk scanner in response to the receipt of an indication that said called line circuit and said requesting line circuit are in the same group, and means for reinitiating the operation of said trunk circuit scanner in response to an indication that said called line circuit and said requesting line circuit are not in the same group.

16. In a switching system, a switching network having a line side and trunk side, a plurality of line circuits arranged into a plurality of groups and connected to said line side, a plurality of trunk circuits connected to said trunk side, a plurality of stations each of which is connected to a different one of said line circuits, means responsive to the dialing of a pickup code at a station connected to a requesting one of said line circuits for scanning said trunk circuits, means responsive to the scanning of one of said trunk circuits currently in a ringing condition for transmitting a call-back signal from said one trunk circuit and through said switching network to a called line circuit to which said one trunk circuit is currently connected, means responsive to the receipt of said signal by said called line circuit for indicating whether said called line circuit is in the same group as said requesting line circuit, and means responsive to an indication that said called line circuit and said requesting line circuit are in the same group for releasing the network connection between said one trunk circuit and said called line circuit and for establishing a network connection from said one ringing trunk circuit to said requesting line circuit.

17. The system of claim 16 wherein said means responsive to the dialing of a pickup code comprises, a register connected to said trunk side, means in said register for storing dialed digits received from any calling one of said stations, and means in said register for detecting the dialing of a pickup code by any one of said stations.

* * * * *